United States Patent Office 3,432,462
Patented Mar. 11, 1969

3,432,462
PROCESS FOR STABILIZING POLYMERS
William W. Gignilliat and John W. Wilder, Longview, Tex., assignors to Eastman Kodak Company, Rochester, N.Y., a corporation of New Jersey
No Drawing. Continuation-in-part of application Ser. No. 449,881, Apr. 21, 1965. This application Apr. 10, 1968, Ser. No. 720,337
U.S. Cl. 260—45.85                   10 Claims
Int. Cl. C08f 45/58, 29/02

ABSTRACT OF THE DISCLOSURE

A method for uniformly incorporating additives into polyolefins by immersing substantially crystalline polyolefins in solid divided form, which have previously been rendered porous, in a solvent solution of at least one additive whereby said additive is adsorbed onto said polyolefin.

---

This application is a continuation-in-part of copending application Ser. No. 449,881, filed Apr. 21, 1965 now abandoned.

This invention concerns a method for producing polyolefins having additives uniformly incorporated therein. In particular, the invention concerns a method for producing polyolefins having stabilizer additives uniformly incorporated therein.

Heretofore, an effective way of compounding additives with polyolefins involved adding the additives in powder form to the polyolefin melt. This is a very troublesome and expensive operation since the polyolefin has to be melted, extruded, and cut. Also, the additive powder must be fed to the extruder at a controlled rate if a uniform dispersion of additive in the polyolefin is to be obtained. A method for controlling the additive feed rate is described in U.S. Patent No. 3,000,854 in connection with antioxidants. In this method, during the extrusion operation, a small side stream of molten polyolefin is drawn continuously from the extruder and is passed, in a molten state, through an ultra-violet analyzer. The ultra-violet analyzer measures additive concentration of the polyolefin melt and controls the rate of additive addition accordingly. Among the disadvantages of this method of additive addition are that there are certain additives which cannot be detected by ultraviolet adsorption. Moreover, the polyolefin must be maintained in the liquid state as it passes continuously through the ultraviolet apparatus. In addition, uniform distribution of additive in the polyolefin depends on an accurate control of additive flow, and uniform distribution of additive in the polyolefin depends on adequate mixing in the extruder barrel. In addition to these problems, continuous feeding of such solid additives as powdered dilaurylthiodipropionate (DLTDP) and butylated hydroxytoluene (BHT) in controlled amounts usually necessitates that they be melted or dissolved in a suitable solvent. Sometimes they can be fed as solids by a commercial feeder. However, oftentimes the distribution of additive in the polyolefin is not uniform and subsequent compounding may be necessary.

Another known method of incorporating additives into polyolefins is by reducing the polyolefin to a powder and dry tumbling the powder with a specific solvent containing the additive in solution under particular conditions where the polyolefin powder swells but does not coalesce. The quantity of solvent used in this method is quite critical and is maintained at a minimum. Obviously, this method has certain disadvantages in that close control must be maintained so as to prevent melting or coalescence of the polyolefin.

In accordance with this invention it has been found that when porous, substantially crystalline polyolefins in solid divided form have been formed from polyolefins having a crystalline fraction and an amorphous fraction by solvent extraction of the amorphous fraction and then immersed, either wet or dry, in a solvent solution of an additive or additives, the additives are quite uniformly adsorbed onto the polyolefins. By this method the concentration of the additives incorporated into the polyolefins may be easily and closely controlled.

The polyolefins to which this invention is applicable include those described in U.S. Patents 3,067,183, 2,692,-259, 2,791,576, 3,083,193, 3,112,300, and 3,112,301 as well as British Patent 810,023. Generally, homopolymers and copolymers derived from α-monoolefins having 2 to 10 carbon atoms may be used. Homopolymers and copolymers of propylene and ethylene are particularly suitable. It is essential, however, that these polyolefins be in solid form, such as pellets, and initially have both a crystalline fraction and an amorphous fraction so that they may be rendered porous by solvent extraction techniques. These materials are most readily available from solution polymerization processes which generally operate in such a manner as to inherently produce solid polyolefins having crystalline and amorphous fractions. Generally, these solution polymerization processes involve polymerization at least one α-monoolefin having 2 to 10 carbon atoms with a lithium-containing stereo-specific catalyst at a temperature of about 100° C. to about 300° C., preferably 140° C. to 300° C., and a pressure of about one atmosphere to about 2000 atmospheres in the presence of a diluent which is a solvent for the polymer at the reaction temperature to produce a solution containing both crystalline and amorphous polymer. Thereafter, the solution is concentrated and the solid polymer containing residual solvent is formed into a divided form such as pellets. The details of these processes as well as the nature of the polyolefins produced therefrom are well known in the art. For example, see copending application Ser. No. 695,820, filed Dec. 18, 1967.

As previously mentioned, the solid polyolefin is rendered porous prior to the immersion step by solvent extraction of the amorphous fraction which is randomly distributed throughout the polyolefin. This solvent extraction is a conventional technique involving the use of a solvent to dissolve out the amorphous fraction. The solvent has substantially no dissolution effect on the crystalline fraction under the conditions employed. A suitable and often used solvent is hexane.

After extraction there remains a solid crystalline polyolefin which is highly porous. This highly porous, solid crystalline polyolefin is then immersed in a solvent solution of an additive or additives whereupon adsorption of the additive onto the polyolefin takes place. After a suitable period of time sufficient to permit adsorption of the desired quantity of additive under the particular conditions employed the solvent solution is drained off leaving solid crystalline polyolefin containing adsorbed additive and which also retains a considerable amount of solvent due to its porosity. Generally, the retained solvent amounts to 30%–125% by weight based on the dry crystalline polyolefin. The solvent-wet, highly porous, solid crystalline polyolefin containing the adsorbed additive is then dried in some conventional manner such as by hot inert gas at about 60–120° C.

During the immersion step the amount of additive adsorbed onto the polyolefin is generally dependent upon three primary factors which can be easily controlled. The first factor is the concentration of the additive, or additives if more than one is being adsorbed at the same time, in the solvent. Generally, the higher the solution concentration the more additive that is adsorbed per unit time. While the concentration may vary over an essentially unlimited range there are obvious practical considerations for which it is preferred to employ concentrations in the range of about 0.01 to about 10.0 weight percent additive in solution and generally in the range of about 0.1 to about 10.0 weight percent.

The second factor is the temperature at which adsorption takes place. Generally, the higher the temperature the greater the rate of adsorption because of the greater energy of the solution and greater permeation of the polyolefin by the solvent solution. However, the temperature should not be so high that the polyolefin would melt or that excessive volatilization of the solvent takes place. Preferably, the temperature should be no higher than that at which negligible dissolution of the polyolefin may take place and at which the additives are negligibly volatile. A suitable temperature range for most uses is between ambient temperature and about 90° C. Temperatures above 90° C. run the risk of softening and melting the polyolefins. A preferred range is about 50° C. to about 65° C.

The third factor to be considered is that of contact time between the polyolefin and the solvent solution of the additives. Generally, longer contact time results in greater total adsorption but the amount adsorbed per unit time decreases as the contact time becomes longer. It is noted that on previously wet polyolefins (already permeated) extended contact time does very little toward increasing the total adsorption of additives.

The immersion step in the process may be carried out either as a batch operation or continuous operation. In a batch operation, a solution of desired concentration is prepared by stirring the desired amounts of additive or additives and solvent under heat, if desired, until solution is effected. To adsorb the additive onto the polyolefin at a specified concentration, the wet or dry polymer is immersed in the additive solution which is preferably at a controlled temperature. Immersion is sustained for the desired length of time and excess solution is drained from the polymer which is then dried free of solvent.

As an example of a continuous operation for carrying out the immersion step, the additive solution is circulated through a vessel through which the porous crystalline polyolefin is either falling or rising, depending on the relative densities of the polyolefin and solution. Before entering the adsorption vessel, the polyolefin may be either wet or dry. Again, the amount of additive adsorbed onto the polyolefin is controlled by solution concentration, temperature, and time of contact. The solution concentration can be maintained by make-up addition, either manual or automatic, of additive and solvent to the solution hold tank. The temperature can be automatically controlled with suitable heaters on the circulating solution. The contact time can be controlled by vessel volume or by solution level in the vessel. The drying operation involves passing hot gas upward through a column of the polyolefin in solid divided form such as pellets. Wet pellets are continuously fed to the top of the column, while dried pellets are continuously discharged from the bottom of the column.

A variety of additives may be incorporated into polyolefins using the above described procedure. It is essential that the additive be at least partially soluble in a suitable solvent. Among these additives are included stabilizers such as antioxidants and ultraviolet light inhibitors, pigments, and various modifiers and property improvers. Particularly good results are obtained with stabilizers such as dilauryl thiodipropionate; butylated hydroxy toluene; 2,6-bis(1-methylheptadecyl)-p-cresol; 4,4'-butylidenebis-(6-tert.-butyl-m-cresol); tris(nonylphenyl) phosphite; p-octylphenyl salicylate; 4-dodecyloxy-2-hydroxy-benzophenone; and the like. Also included, using suitable solvents, are distearyl pentaerythritol diphosphite, zinc dibutyldithiocarbamate and a polyester of thiodipropionic acid and 1,4-cyclohexanedimethanol.

The solvent employed with the additives are conventional solvents readily ascertained for the intended use from their published properties. In particular, they should be good solvents for the specific additives with which they are used yet essentially non-solvents for the polyolefins, at least at the temperatures employed during the immersion step. Moreover, the solvents should be capable of volatilization at a temperature below the melting points of the polyolefins. Such solvents may generally be described as aliphatic alkanes and cycloalkanes as well as the corresponding alcohols. For polyolefins such as polypropylene, hexane is an example of a good solvent when used with such additives as dilauryl thiodipropionate, butylated hydroxy toluene, tris(nonylphenyl) phosphite and 2,6-bis(1-methylheptadecyl)-p-cresol, while acetone is an example of a good solvent when used with 4,4'-butylidenebis-(6-tert-butyl-m-cresol). Other solvents such as pentane, heptane, cyclohexane, and the like, may also be used.

The following illustrations will serve to provide further understanding of this invention.

Polypropylene pellets having a crystalline fraction and an amorphous fraction are obtained from a conventional process involving solution polymerization of propylene. Generally in this process polypropylene is formed by the action of lithium containing stereospecific catalyst, such as lithium aluminum hydride and titanium trichloride; under pressure of from about 700–2000 p.s.i.g.; in an inert liquid solvent, such as saturated hydrocarbons boiling above about 140° C.; at a temperature of from about 100–200° C. After pressure letdown, polymer solution from the reaction is diluted with more solvent and is filtered free of solid catalyst particles. Following the filtration step, the polypropylene solution is concentrated by vaporization of the major portion of the solvent. The molten polymer concentrate is then solidified by water cooling and is cut into pellets.

The pellets are then subjected to well known extraction procedures using hexane to remove the amorphous fraction of the polypropylene. The resulting pellets are highly porous and well permeated by the hexane. Prior to the immersion step of this invention these pellets may be dried, however this is not essential.

Using samples of the above described porous pellets of substantially crystalline polypropylene in each case the following examples illustrate the immersion step of the invention.

Example 1

A solution of 1 weight percent dilauryl thiodipropionate (DLTDP) in hexane is prepared. A number of small samples of the polypropylene pellets are immersed in portions of the 1 percent antioxidant solution at different temperatures. The time span for each submersion is about 20 minutes. After each soaking, the pellets are drained of excess hexane solution, although considerable quantities of hexane are still retained in the porous structure of each pellet, and then dried in a vacuum oven at about 80° C. Each polymer sample is then analyzed for percent DLTDP by infrared analysis of a 0.03 cm. thick button pressed from the sample.

TABLE 1

| Adsorption temperature, ° C.: | Wt. Percent DLTDP adsorbed on polymer |
|---|---|
| 24 | 0.039 |
| 35 | 0.086 |
| 45 | 0.135 |
| 60 | 0.145 |

The analyses show that the additive can be effectively adsorbed onto the polypropylene in controlled amounts and that a correlation exists between temperature of adsorption and the amount of DLTDP adsorbed onto the polymer.

Example 2

Similar samples of polypropylene pellets are immersed in hexane solution of varying DLTDP concentrations and the results are shown below. Each soaking time is about 20 minutes at a temperature of about 60° C. The same drying and analysis procedures as described in Example 1 are employed.

TABLE 2

| Wt. Percent DLTDP in hexane: | Wt. Percent DLTDP adsorbed on polymer |
|---|---|
| 0.5 | 0.050 |
| 0.5 | 0.075 |
| 1.0 | 0.130 |
| 1.0 | 0.150 |
| 2.0 | 0.240 |
| 2.0 | 0.280 |
| 3.0 | 0.390 |
| 3.0 | 0.400 |

The above data when plotted on rectangular graph paper shows an almost straight line correlation between solution concentration and percent DLTDP adsorbed on polymer.

Example 3

The above procedure is repeated at a soaking temperature of about 60° C., and a hexane solution concentration at 1 weight percent DLTDP. The soaking time is varied, however, to determine its effect on adsorption of stabilizer onto previously dry polymer.

TABLE 3

| Soaking time, min.: | Wt. Percent DLTDP adsorbed on polymer |
|---|---|
| 5 | 0.111 |
| 10 | 0.131 |
| 20 | 0.139 |

The results indicate that total adsorption is directly related to contact time.

Example 4

Further examples show that more than one antioxidant can be adsorbed onto hexane-wet pellets at the same time from the same solution. Hexane solutions containing varying amounts of both dilaurylthiodipropionate (DLTDP) and 2,6-bis(1-methylheptadecyl)-p-cresol (BMHPC) are employed. In this example, the hexane-wet pellets are soaked in the antioxidant solution at 60° C.

TABLE 4

| Soaking time, min. | Wt. percent stabilizer in hexane solution | | Wt. percent stabilizer adsorbed on polymer by analysis | |
|---|---|---|---|---|
| | DLTDP | BMHPC | DLTDP | BMHPC |
| 20 | 0.75 | 0.38 | 0.08 | 0.06 |
| 20 | 0.75 | 0.38 | 0.095 | 0.06 |
| 40 | 0.75 | 0.38 | 0.136 | 0.057 |
| 40 | 0.75 | 0.38 | 0.12 | 0.06 |
| 10 | 1.50 | 0.38 | 0.19 | 0.05 |
| 40 | 1.50 | 0.38 | 0.21 | 0.03 |
| 40 | 1.50 | 0.38 | 0.18 | 0.06 |
| 40 | 1.50 | 0.75 | 0.17 | 0.06 |

Example 5

Polyolefins having stabilizers incorporated therein by the method of this invention have good stability to oxidation. To determine the relative stability lives of the polypropylene samples, the samples are placed in a heated flask under hot air purge. While under hot air purge, the samples are analyzed for acid number and melt index (melt flow at 230° C.) periodically to determine how long the samples can withstand oxidative degradation. The stability lives of polypropylene stabilized by the method of this invention is shown in Table 5. Stability life, in these examples, is defined as the time required, at a given temperature, for a polymer sample to degrade under air to the extent that its melt index increases 25–50 percent.

TABLE 5.—POLYPROPYLENE STABILITY LIVES UNDER AIR AT 66° C.

| Wt. percent stabilizer on polymer | | Stability life, days |
|---|---|---|
| DLTDP | BHT | |
| 0 | 0 | 2 |
| 0.05 | 0 | 16 |
| 0.1 | 0.05 | >300 |

Example 6

In this example stabilizers are incorporated into propylene-ethylene copolymer in accordance with this invention and stability is evaluated in a similar manner as in Example 5. Such copolymers may be prepared, for example, by polymerizing propylene for a period at temperatures of from about 120° C. to about 180° C. and pressures of from about 400–600 p.s.i.g. in hydrocarbon solvent using a stereospecific coordination catalyst, then purging the remaining propylene and then feeding in ethylene under similar pressure for a period to produce what may be termed a period copolymer. Any amorphous polymer may then be hexane extracted to leave essentially crystalline polymer which is highly porous.

TABLE 6.—PROPYLENE-ETHYLENE COPOLYMER STABILITY LIVES UNDER AIR AT 100° C.

| Wt. percent antioxidant on polymer | | Stability life, days |
|---|---|---|
| DLTDP | BHT | |
| 0 | 0 | 0.1 |
| 0.1 | 0 | 1 |
| 0.2 | 0.1 | 120 |

Example 7

To determine the uniformity of the distribution of additive, several samples from the same batch of polypropylene polymer stabilized by incorporating stabilizers therein by the method of this invention are analyzed for percent antioxidant. The results show a standard deviation of 0.03 weight percent DLTDP from an average analysis of 0.10 weight percent DLTDP. To determine the uniformity of additive on polymer stabilized by incorporating stabilizers therein by the conventional extrusion method, several samples from an extruded batch are analyzed for percent stabilizer. It should be pointed out that the batch is blended, after extrusion and pelletizing, by pneumatically conveying the pellets from the bottom of the bin to the top for several hours. This blending operation undoubtedly improves the distribution of the variously loaded pellets, although it most likely does not redistribute the stabilizer itself. Results show a standard deviation of 0.06 weight percent DLTDP from an average analysis of 0.15 weight percent DLTDP. The results can be summarized as follows:

TABLE 7

| Method of stabilizer addition | Average wt. percent DLTDP | Standard deviation, wt. percent | 95% confidence span, wt. percent |
|---|---|---|---|
| This invention | 0.10 | 0.03 | 0.04–0.16 |
| Melt extrusion and blending | 0.15 | 0.06 | 0.03–0.27 |

The invention has been described in detail, however it will be understood that variations and modifications can be effected within the spirit and scope of the invention described hereinabove and in the appended claims.

We claim:

1. A method of producing polyolefins having additives uniformly incorporated therein comprising:
   (A) forming solid, porous poly-α-olefins from poly-α-olefins in divided form having a crystalline fraction and an amorphous fraction by extracting said amorphous fraction with a solvent,
   (B) immersing said solid, porous polyolefins in a solvent solution of at least one additive at a temperature at which said poly-α-olefins are substantially insoluble in said solvent and for a period of time sufficient for said poly-α-olefins to adsorb at least some of said additive, (C) and recovering said poly-α-olefins containing adsorbed additive.

2. A method of producing poly-α-olefins having additives uniformly incorporated therein comprising:

(A) forming solid, porous poly-α-olefin pellets from poly-α-olefin pellets having a crystalline fraction and and amorphous fraction by extracting said amorphous fraction with a solvent, (B) immersing said solid, porous poly-α-olefin pellets in a solvent solution of at least one additive at a temperature at which said pellets are substantially insoluble in said solvent and for a period of time sufficient for said pellets to adsorb at least some of said additive.

(C) and recovering said pellets containing adsorbed additive.

3. A method according to claim 2 wherein said additive includes at least one stabilizer.

4. A method according to claim 3 wherein said stabilizer is dilauryl thiodipropionate, butylated hydroxytoluene, 4,4′ - butylidene - bis(6-tert.-butyl-m-cresol), tris(nonylphenyl)phosphite, or 2,6-bis(1-methylheptadecyl-p-cresol.

5. A method according to claim 2 wherein said additive includes dilauryl thiodipropionate and 2,6-bis(1-methylheptadecyl)-p-cresol.

6. A method according to claim 2 wherein said solvent is hexane.

7. A method of producing crystalline polyolefin having at least one stabilizer uniformly incorporated therein comprising:

(A) forming solid, porous pellets of poly-α-olefin by polymerizing at least one α-monoolefin having 2 to 10 carbon atoms with a lithium containing stereospecific catalyst at a temperature of about 140° C. to about 300° C. and a pressure in the range of about one atmosphere to about 2000 atmospheres in the presence of a diluent which is a solvent for one polymer at the reaction temperature and thereby producing a solvent solution containing crystalline and amorphous polymer, concentrating said solution to form a solid crystalline and amorphous polymer concentrate containing residual solvent, forming said polymer into pellets having a crystalline fraction and an amorphous fraction and extracting said pellets with a solvent for the amorphous fraction to produce solid, porous pellets of crystalline poly-α-olefins;

(B) immersing the solid, porous pellets of crystalline poly-α-olefin in a solvent solution of at least one stabilizer at a temperature at which said pellets are substantially insoluble in said solvent and for a period of time sufficient for said pellets to adsorb at least some of said stabilizer;

(C) and recovering the solid, porous pellets of crystalline poly-α-olefin containing adsorbed stabilizer.

8. A method according to claim 7 wherein said poly-α-olefin is polypropylene.

9. A method according to claim 7 wherein said poly-α-olefin is a copolymer of ethylene and propylene.

10. A method according to claim 7 wherein said solvent in each instance is hexane.

References Cited

UNITED STATES PATENTS

| | | | |
|---|---|---|---|
| 3,235,532 | 2/1966 | Hopper et al. | 260—45.95 |
| 3,275,715 | 9/1966 | O'Leary | 260—45.7 XR |
| 3,277,046 | 10/1966 | Listner | 260—45.85 |
| 3,304,274 | 2/1967 | Eng | 260—45.7 XR |
| 3,318,841 | 5/1967 | Tomlinson et al. | 260—45.7 XR |
| 3,361,713 | 1/1968 | Meyer et al. | 260—45.85 |
| 3,380,986 | 4/1968 | Van Vucht | 260—94.9 |

DONALD E. CZAJA, Primary Examiner.

M. J. WELSH, Assistant Examiner.

U.S. Cl. X.R.

260—457, 45.95, 94.9